United States Patent [19]
Boerbert

[11] Patent Number: 5,272,754
[45] Date of Patent: Dec. 21, 1993

[54] SECURE COMPUTER INTERFACE

[75] Inventor: William E. Boerbert, Minneapolis, Minn.

[73] Assignee: Secure Computing Corporation, Arden Hills, Minn.

[21] Appl. No.: 676,885

[22] Filed: Mar. 28, 1991

[51] Int. Cl.$^5$ .............................................. H04K 1/00
[52] U.S. Cl. ...................................... 380/25; 380/23; 380/4
[58] Field of Search ........................ 380/23, 24, 25, 49, 380/4, 47

[56] References Cited

U.S. PATENT DOCUMENTS

| | | | |
|---|---|---|---|
| 3,956,615 | 5/1976 | Anderson et al. | 380/49 X |
| 4,438,824 | 3/1984 | Mueller-Schloer | 380/23 |
| 4,885,789 | 12/1989 | Burger et al. | 380/25 |
| 4,965,568 | 10/1990 | Atalla et al. | 380/23 X |
| 4,998,279 | 3/1991 | Weiss | 380/25 X |

OTHER PUBLICATIONS

"Secure Computing: The Secure Ada Target Approach," by W. E. Boebert, R. Y. Kain and W. D. Young, *Scientific Honeyweller*, Jun., 1985.
"Secure Ada Target: Issues, System Design, and Verification," by W. E. Boebert, R. Y. Kain, W. D. Young and S. A. Hansohn, *Proceedings of the IEEE Symposium on Security and Privacy for 1985*, IEEE Computer Society, Apr., 1985.
"Using Embedded COMSEC: An Integrator's Viewpoint," by Thomas Kibalo and W. E. Boebert, *Proceedings of the 1st AFCEA Mid-Atlantic Intelligence Symposium* (1986).

*Primary Examiner*—Tod R. Swann
*Attorney, Agent, or Firm*—Merchant, Gould, Smith, Edell, Welter & Schmidt

[57] ABSTRACT

Communication elements for secure data communication between remote nodes of a computer system on a standard communications medium. Terminals, workstations and personal computers are connected through a user-side terminator to a standard unsecured communications medium. Processors are connected through a computer-side terminator to the same medium. The combination of a user-side terminator, a computer-side terminator and a standard communications medium constitutes a secure computer interface.

5 Claims, 7 Drawing Sheets

SECURE COMPUTER INTERFACE

This invention was developed with the support of U.S. Government Contract MD A904-87-C-6011, in the Maryland Procurement Office. The Government has certain rights in the invention.

BACKGROUND OF THE INVENTION

1. Field of the Invention

The present invention relates to an apparatus and method for secure communications between computers, and more particularly to the application of end-to-end encryption to ensure secure communications on standard communications media.

2. Background Information

In the design of a secure computing environment the communication links are the most difficult to protect and therefore the easiest to compromise. Terminals and computers can be placed in limited access, physically secure areas to limit exposure to hostile agents. But any computer with an electrical connection extending outside the physically secure area is subject to penetration and compromise. Communication links can be attacked in a variety of ways. Active attacks are those in which masquerading "imposter" hardware or software is inserted into the link. For example, hardware might be inserted that emulates a user with extensive access privileges in order to access sensitive information. Or a shell program may be constructed that deceives a user into revealing sensitive information such as a password. Passive attacks are those in which data on the link intended for one user is copied and sent to another user, or captured by other individuals.

As computers have proliferated various methods have developed for computer-to-computer and computer-to-terminal communication. The first communications were point-to-point. However, as the number of points increased, point-to-point communications became too complex and costly. For large networks over relatively short distances, point-to-point connections have been replaced with local area networks (LANs) such as Ethernet or Token Ring which permit communication between a number of different computers and terminals on one or two wires.

For longer distances, modems offer a point-to-point link over a telephone line. Wide area networks (WANs) using combinations of fiber optic and copper telephone lines connect local area networks into larger networks.

Networks are at great risk in a security breach. The typical computer network functions like a telephone party line; anyone on the line can listen to and participate in the conversation. Passive attacks can eavesdrop on all communication on the network while active attacks have the potential to gain access to each network computer.

There are two aspects to security in a computer network with remote nodes. The first is authenticating the identity of both the source and the destination node in a communication. The second is making sure that communication between the nodes remains confidential.

Prior art systems have typically addressed one or the other of these security aspects. Perhaps the best known identity authentication method is the use of a password on logging into a system. Passwords provide a level of user authentication by tying a series of keystrokes to a user. The user must enter the password at the beginning of a session, or when moving to a higher level of access privilege.

A second method is the use of a dial-back modem. Dialback modems are used to verify that the location of the remote device is one of the acceptable places for remote devices. This reduces the chances of an unauthorized user accessing the computer by requiring all remote access be performed from a set of authorized sites.

These techniques and others like them rely on restricting access to a computer service to authenticated users. Once the restriction is overcome, access is achieved and there is no more checking. These methods offer limited feedback to the user; security is geared toward authenticating the remote site, not the computer being addressed. This approach is flawed in a security sense. There are certain functions where one wants to make sure that both ends—the computer and the user—are sure who is at the other end. The computer needs to make sure that it is talking to the authorized user and the authorized user needs to make sure he or she is talking to the computer and not some piece of malicious software masquerading as the computer.

Efforts to keep communications confidential have typically revolved around encrypting data prior to sending it on an unsecured medium or securing the medium by building a barrier around it to restrict access (hardening). Attempts to encrypt data traffic to improve security have encountered little commercial success due to a reliance on costly cryptographic devices which depend on complex and error-prone procedures for management of cryptographic keys and which may be subject to export restrictions. Hardening is often costly and may be impossible to accomplish (for instance, on public telephone lines).

It is clear that there is a need for an improved method of communication between computers and between computers and terminals that provides a high degree of security in data transfers. The method should provide a mechanism for authenticating the source node and the destination node in each message transfer and for maintaining confidentiality within each transfer. It should limit cost by permitting the use of standard communications methods and media.

SUMMARY OF THE INVENTION

The present invention provides communication elements for secure data communication between remote nodes of a computer system on a standard communications medium. Terminals, workstations and personal computers are connected through a userside terminator to a standard unsecured communications medium. Processors are connected through a computer-side terminator to the same medium. The combination of a user-side terminator, a computer-side terminator and a standard communications medium constitutes a secure computer interface.

Transfers can be user node to user node, computer node to computer node or between a user node and a computer node. Communications between nodes are end-to-end encrypted under user control using a one-time pad algorithm.

Access to the computer system is restricted. To gain access to a user node, a prospective user must insert a token containing his name and access authorization level into the userside terminator attached to the terminal at that node and then enter a password. A secure computer node verifies the user and restricts activity to the access authorization level.

According to another aspect of the present invention, a multilevel secure computer is connected through a computer-side termination to the unsecured communications medium. The combination of the secure computer interface and a multilevel secure computer provides a computing environment that is difficult to penetrate or compromise.

According to yet another aspect of the present invention, a countersign is provided to limit accesses to a secure user node by an agent using a reproduced token.

DETAILED DESCRIPTION OF THE PREFERRED EMBODIMENTS

Figure 1:
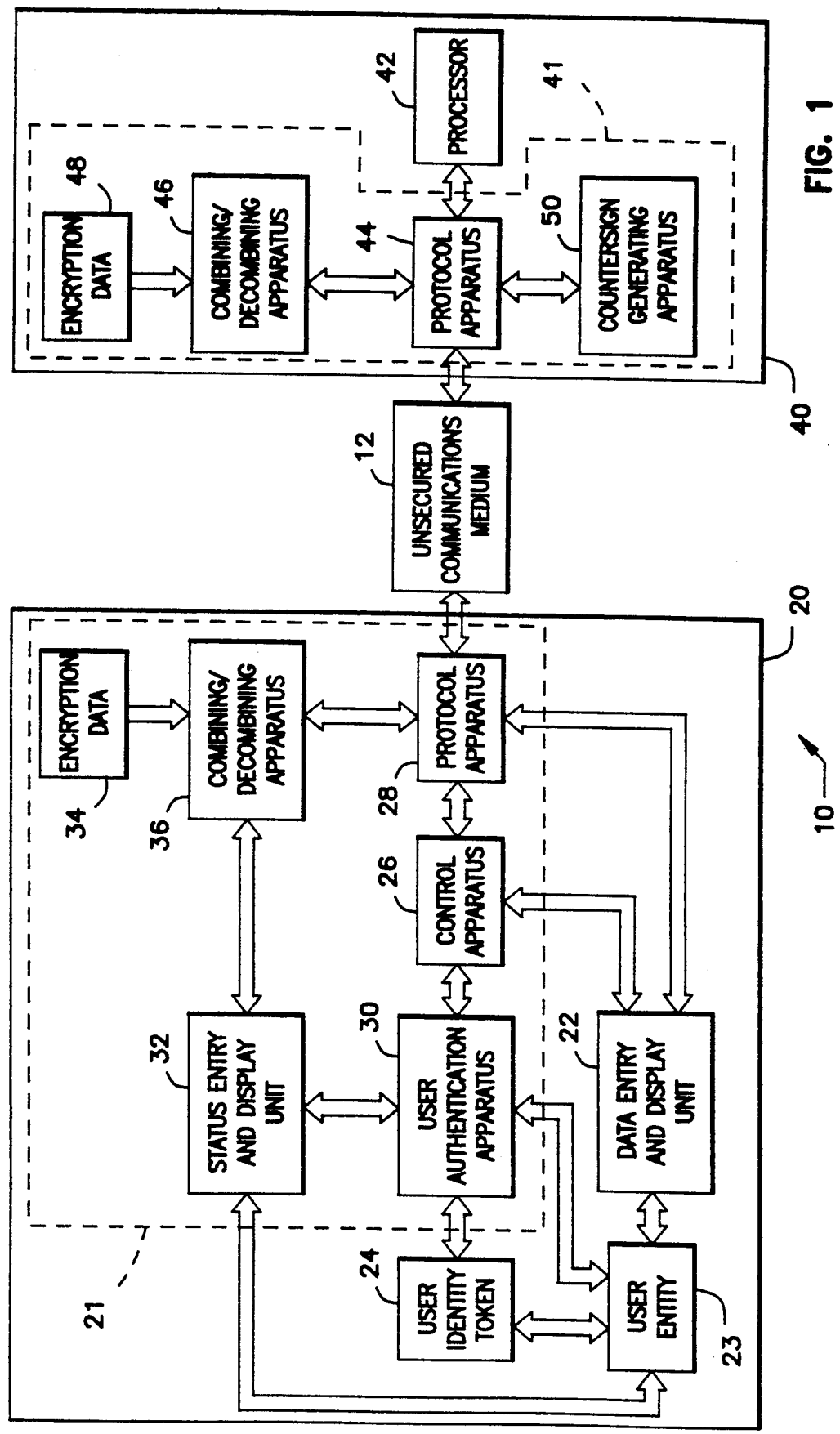
FIG. 1 is a system level block diagram representative of a user node and a computer node according to the present invention.

In the following Detailed Description of the Preferred Embodiments, reference is made to the accompanying Drawings which form a part hereof, and in which are shown by way of illustration specific embodiments in which the invention may be practiced. It is to be understood that other embodiments may be utilized and structural changes may be made without departing from the scope of the present invention.

The present invention consists of communicating elements placed at remote nodes of a computer system. These elements implement end-to-end encryption with a one-time pad encryption algorithm to ensure secure communication over unsecured media. End-to-end encryption, as distinguished from link encryption, is a technique whereby data is encrypted as close to its source node as possible and decrypted only at its ultimate destination. The present invention defines two modes of communicating between remote nodes of a computer system: Trusted Path and Untrusted User. In Trusted Path mode all message transfers are sent encrypted using the one-time pad encryption algorithm. In Untrusted User mode data is sent unencrypted. In the present invention, Trusted Path mode can be initiated and terminated by either node in a node-to-node transfer. Trusted Path mode cannot be used for broadcasting messages.

In the present invention, data is sent in packets. Encrypted messages are encrypted before being formed into a packet such that the packet protocol fields are left unencrypted. This is necessary for intelligible communication.

A one-time pad is an encryption technique in which a message of n bits is encrypted by combining the message with a random sequence of n bits, called a keystream. This type of cipher is theoretically unbreakable. The only way to recover the message is to decombine the encrypted message with the original random keystream. Therefore a copy of the keystream must be present in some form at both the source and destination. This requirement is usually met by delivering the keystream separate from the encrypted message using a separate trusted path to maintain confidentiality.

Each keystream is used one time then discarded. The first bit of a message is combined with the first bit of the keystream, the second with the second bit and so on. The next message to be encrypted starts after the last bit used in the previous message. Once the keystream is exhausted, message encryption is prevented until a new keystream has been installed. This is a cardinal rule; keystreams that are used repeatedly increase the risk of providing enough information to break the code of previous messages. Nodes that communicate to more than one remote node require a separate keystream for each remote node. For a fully secure system of n remote nodes, the system administrator may need to maintain up to $(n-1)$ factorial keystreams.

One-time pad combining and decombining can be done using any reversible method, such as addition/subtraction with or without carry, or other, more complex algorithms. In the preferred embodiment of the present invention the one-time pad encryption algorithm enciphers a message of n bits by XORing it with a random sequence of n bits. The message is then deciphered by XORing it with the same sequence of bits.

Trusted Path mode transfers provide protection against active and passive wire tapping through end-to-end encryption of all transfers. Agents monitoring the communications medium can neither observe nor alter encrypted communications between the two nodes.

A computer system 10 incorporating a secure computer interface according to the present invention is shown in FIG. 1. Computer system 10 includes a user node 20 connected through a communications medium 12 to a computer node 40. Computer node 40 acts as a server for a multi-user system. User node 20 serves as an interface between a user 23 and computer node 40.

Secure communications is ensured by encrypting sensitive information that is to be transferred between user node 20 and computer node 40 on medium 12. All transfers, encrypted or not, are passed through a user-side terminator 21 in user node 20 and a computer-side terminator 41 in computer node 40. Userside terminator 21 and computer-side terminator 41 are the two ends of the secure communications path. Computer-side terminator 41 is connected to a processor 42 for performing data processing while user-side terminator 21 is connected to data entry unit 22. In order to maintain security, each terminator must be placed in a physically secure area in close proximity to its respective data entry unit 22 or processor 42. Data is formatted into packets and can be transferred as either encrypted (Trusted Path) or unencrypted (Untrusted User) data.

Computer-side terminator 41 encrypts and decrypts Trusted Path data passed between processor 42 and communications medium 12. Computer-side terminator 41 is enclosed in a tamperresistant housing separate from processor 42. Terminator 41 includes protocol apparatus 44, combining/decombining apparatus 46, encryption data storage device 48 and countersign generating apparatus 50. Protocol apparatus 44 is connected to combining/decombining apparatus 46 and countersign generating apparatus 50. Protocol apparatus 44 packetizes data sent from processor 42 to communications medium 12. That data may be sent either encrypted or unencrypted. If encrypted, data is sent through combining/decombining apparatus 46 for the performance of an encryption algorithm such as the one-time pad.

A user authentication apparatus 30 is provided to verify the identity of a user entity 23 who wishes to gain access to system 10. User authentication apparatus 30 is connected to control apparatus 26 and status entry and display unit 32. It is designed to accept a user token 24 and to transmit information read from token 24 to processor 42. In order to gain access to computer system 10, a user identity token 24 belonging to user entity 23 is placed in proximity to user authentication apparatus 30. A password or other secondary means of proving identity is entered through status entry and display unit 32 and used to verify that the proper user 23 is accessing system 10. Status entry and display unit 32 also provides feedback to user entity 23 as to the status of communications medium 12.

Countersign generating apparatus 50 operates in conjunction with token 24 to provide another layer of computer system security. Each time a user 23 logs off the system countersign generating apparatus 50 generates a new countersign and sends the new countersign to user-side terminator 21 where it is written to token 24. This prevents an agent from making a copy of token 24 and repeatedly accessing computer system 10 as user 23. Use of more than one copy of token 24 in system 10 is detected through the countersign. An incorrect countersign results in processor 42 generating a "Countersign Failure" control packet and denying access to the user.

A copy of the keystream is kept at both ends of the medium 12 (in encryption data storage devices 34 and 48). As stated previously, each keystream is used only one time. Once exhausted, encryptions are prevented until a new keystream has been installed on both sides of medium 12. In computer system 10, combining/decombining apparatus 46 is connected to encryption data storage device 48 which provides the keystream data used in the one-time pad algorithm.

Likewise, user-side terminator 21 encrypts and decrypts sensitive data passed between data entry unit 22 and communications medium 12. In the preferred embodiment, user side terminator 21 is enclosed in a tamper-resistant housing separate from data entry means 22 and having a control apparatus 26, a protocol apparatus 28, a user authentication apparatus 30, a status entry and display unit 32, an encryption data storage device 34 and a combining/decombining apparatus 36. Protocol apparatus 28 performs the packetizing function on data before transferring it out onto medium 12. Protocol apparatus 28 also receives packets from medium 12, removes the protocol layers, forwards the message to data entry unit 22 and generates appropriate status messages. Protocol apparatus 28 is connected to combining/decombining apparatus 36 and data entry unit 22 for transfer of data to and from medium 12. Data may be transferred as encrypted or unencrypted data. If encrypted, data is passed from protocol apparatus 28 to combining/decombining apparatus 36 for execution of the one-time pad. Combining/decombining apparatus 36, in turn, is connected to encryption data storage device 34 for retrieval of the keystream required for the onetime pad.

Control apparatus 26 is connected to protocol apparatus 28 for execution of the end-to-end verification tests required to prove secure communication. Communication between control apparatus 26 and processor 42 can be either in encrypted or unencrypted message packets.

In the preferred embodiment, processor 42 is a multilevel secure computer capable of recognizing data of varying sensitivity and users of varying authorizations, and ensuring that users gain access to only that data to which they are authorized. Such a computer is described in "Secure Computing: The Secure Ada Target Approach" by Boebert, Kain, and Young published in *Scientific Honeyweller* in June, 1985 and disclosed in U.S. Pat. Nos. 4,621,321; 4,713,753; and 4,701,840 granted to Boebert et al. and assigned to the present assignee, the entire disclosures of which are hereby incorporated herein by reference. A multilevel secure computer comprises a Security Kernel used for enforcing the rules of access and an Untrusted Subset which performs the functions unrelated to security. The Security Kernel restricts the actions of software running in the Untrusted Subset such that malicious code cannot affect other code or data in the system.

The use of a multilevel secure computer in conjunction with the present invention creates a computing environment which is very difficult to penetrate or compromise. Data entry unit 22 communicates with the multilevel secure computer through communications medium 12 by means of user-side terminator 21 and computer-side terminator 41. All communication between user node 20 and processor 42 is handled by the Security Kernel. The Security Kernel verifies that data requested by data entry unit 22 is at an access level authorized for user 23 and that data to be stored in processor 42 by data entry unit 22 is written to files with the correct access levels.

During Trusted Path mode and when used with a multilevel secure computer, the countersign mechanism offers additional protection against malicious intrusion. Countersign generating apparatus 50 is implemented in software in the Security Kernel of the multilevel secure computer. Each time a user entity 23 is identified to the Security Kernel (e.g., each new session on processor 42), countersign generating apparatus 50 generates a fresh countersign. Countersigns are words, symbols, or phrases which are easy to remember and which are generated by some process which makes it computationally infeasible to guess from one countersign what the value of the next one will be.

This countersign is passed to the Security Kernel and presented by it as the header to each message it sends to user 23. The countersign is never made available to malicious software in the Untrusted Subset of processor 42, is protected by encryption when exposed to communications medium 12, and is computationally infeasible to guess. Its presence at the start of a message therefore is a positive indication to user entity 23 that the message is actually from the Security Kernel and not from malicious code or from an active wiretap on communications medium 12.

This approach provides a constant verification not only of the user's identity but also of the identity of processor 42. This is crucial for the transfer of sensitive information.

Figure 2:
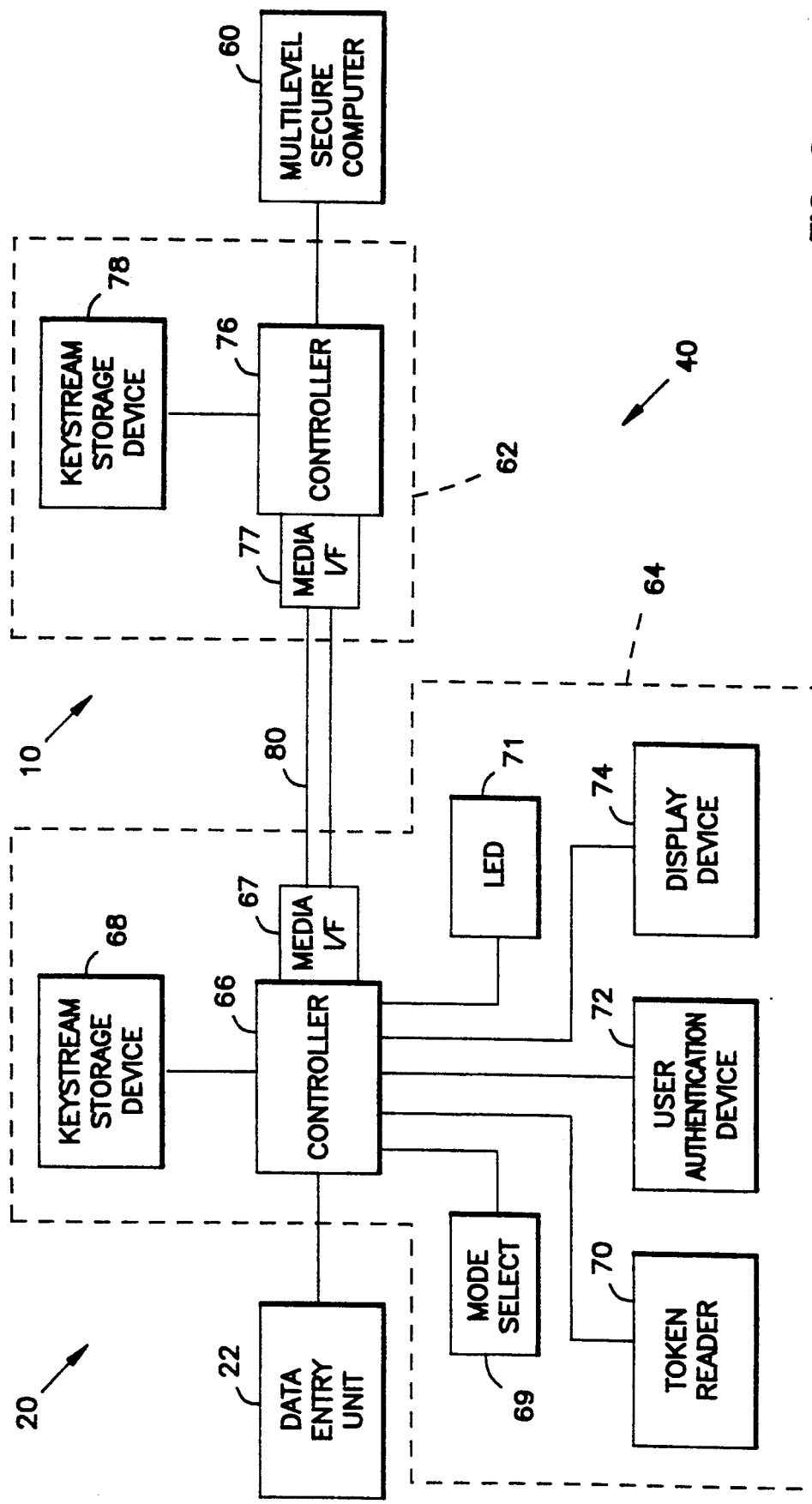
FIG. 2 is an electrical block diagram representation of a user node and a computer node according to the present invention.

An electrical block diagram representative of the preferred embodiment of computer system 10 of FIG. 1 is shown in FIG. 2. Data entry unit 22 is connected through user side terminator 64 to communications medium 80. Communications medium 80 is connected through computer side terminator 62 to multilevel secure computer 60. Multilevel secure computer 60 includes an operating system and the application code needed to interface to a remote node. User side terminator 64 encrypts sensitive information intended for computer 60 and sends it in packets over communications medium 80. Computer-side terminator 62 receives the encrypted data from medium 80, decrypts it and sends the result to computer 60. Likewise, computer-side terminator 62 encrypts sensitive information sent from computer 60 and sends it over medium 80 to user-side terminator 64 where it is decrypted and presented to data entry unit 22. User-side terminator 21 and computer-side terminator 41 can be realized in hardware, software or a combination of both and may reside as separate boxes or be integrated in a greater or lesser degree into data entry unit 22 and multilevel secure computer 60.

In the preferred embodiment, user side terminator 64 is enclosed in a separate housing having a controller 66 connected to a media interface 67, a keystream storage device 68, a mode select button 69, a token reader 70, an LED 71, a user authentication device 72 and a display device 74. Mode select button 69 can be actuated by user 23 to move between Trusted Path and Untrusted User modes. LED 71 is a standard light emitting diode used to indicate Trusted Path mode (ON) or Untrusted User mode (OFF). User authentication device 72 is a keypad that can be used to enter a password in order to verify the owner of identity token 24. And display device 74 is an LCD display for displaying status and error messages.

In an alternate embodiment, user authentication device 72 could include a biometric device for determining a unique physical attribute of user 23 such as fingerprints, palmprints or retinal pattern. That data would then be sent to computer 60 during the user verification process described in FIG. 4.

In the preferred embodiment, controller 66 includes a microprocessor and read-only memory. Program code for the encryption algorithm and for controlling message transfer and user interface control is stored in read-only memory and executed by the microprocessor.

Controller 66 receives messages from data entry unit 22 intended for computer 60, encrypts those messages with the keystream stored in keystream storage device 68 and sends them to media interface 67. Media interface 67 packetizes the messages and sends the packets over communications medium 80 to computerside terminator 62. Computer-side terminator 62, likewise, is a separate enclosure containing a controller 76 connected to a media interface 77 and a keystream storage device 78. Media interface 77 receives packetized information from communications medium 80, removes the packet protocol and sends the result to controller 76. Controller 76 performs the decryption and presents the decrypted messages to computer 60. Likewise, messages sent from computer 60 to data entry unit 22 are encrypted by controller 76 using keystream storage device 78. The resulting packets are sent over communications medium 80 to the user side terminator 64. There they are decrypted and presented to data entry unit 22.

In the preferred embodiment, keystream storage devices 68 and 78 are Digital Audio Tape (DAT) drives. Digital Audio Tape is used because of its superior density and since, due to the serial nature of the one-time pad, DAT's higher seek times become less significant. Keystreams are generated at computer 60 and recorded on a DAT cartridge by device 78. One cartridge is then carried to the remote node by the system administrator. Encryption data cartridges must be protected by some appropriate physical security mechanism, such as storage in a safe, when the terminators are unattended.

A separate keystream is used for communication between each set of nodes that require enciphered communication. That keystream is used both to encrypt messages to be sent to the other node and to decrypt messages received from the other node. Therefore a separate remote node pointer pointing at its respective next keystream bit must be maintained at each node for all relevant remote nodes. If the pointers become unsynchronized, communication becomes undecipherable. If this should happen the first node to recognize the problem will resynchronize the keystream by sending an unencrypted message to the other node listing the location of the next keystream bit to use. In the preferred embodiment more than one keystream can be accommodated in each DAT device 68 or 78. That is, a tape cartridge can be segmented into as many keystream segments as necessary.

Once installed, a keystream is used until it is exhausted. Then a cartridge containing a new keystream must be installed in order to perform encryption.

In the preferred embodiment, user identity token 24 is a smart card, a planar module the size of a credit card which contains a microcontroller and nonvolatile memory. Token reader 70 is smart card reader capable of reading and writing data from user identity token 24. Communications medium 80 is Ethernet and media interfaces 67 and 77 are commercially available Ethernet interface integrated circuits used for implementing the TCP/IP protocol. The TCP/IP protocol permits the use of different preambles in messages to the same node. In the present invention this is used to differentiate encrypted messages from unencrypted messages. Messages are encrypted prior to being packetized. This is because protocol layers cannot be encrypted without being rendered unintelligible to standard Ethernet components.

In an alternate embodiment, communications medium 80 could be a telephone line and media interfaces 67 and 77 could be implemented with modems. In that implementation message packetizing would be performed by controllers 66 and 76.

In the preferred embodiment, controller 66 is connected to data entry unit 22 through a serial communications link. Terminator 64 also provides power (not shown) to data entry unit 22 in order to perform a reset by cycling power. Data entry unit 22 can be a terminal, workstation or personal computer. Controller 76 is connected to computer 60 through a bus interface card (not shown).

In order to maintain security it is necessary to reset data entry unit 22 to a known state at the initiation or termination of certain operations. A typical reset state for data entry unit 22 would be one in which its display screen was blank and all internal storage (e.g., typeahead buffers) was cleared. A typical situation requiring reset is when user entity 23 finishes work and leaves data entry unit 22 unattended; it should not be possible for an unauthorized person to examine the residual data left on the display screen or probe data entry unit 22 for any residual data carried inside it. In addition, data entry unit 22 is reset each time user node 20 toggles from Untrusted User mode to Trusted Path mode and back.

The manner of this reset is dependent upon the degree to which user-side terminator 64 is integrated into data entry unit 22. If the degree of integration is high, the reset may occur as the result of an internal control signal. If user-side terminator 21 is physically separate from data entry unit 22, then the reset may occur by a process such as cycling the power to data entry unit 22 off and on as in the preferred embodiment above, or by sending appropriate commands via the data stream for data entry unit 22.

Figure 3:
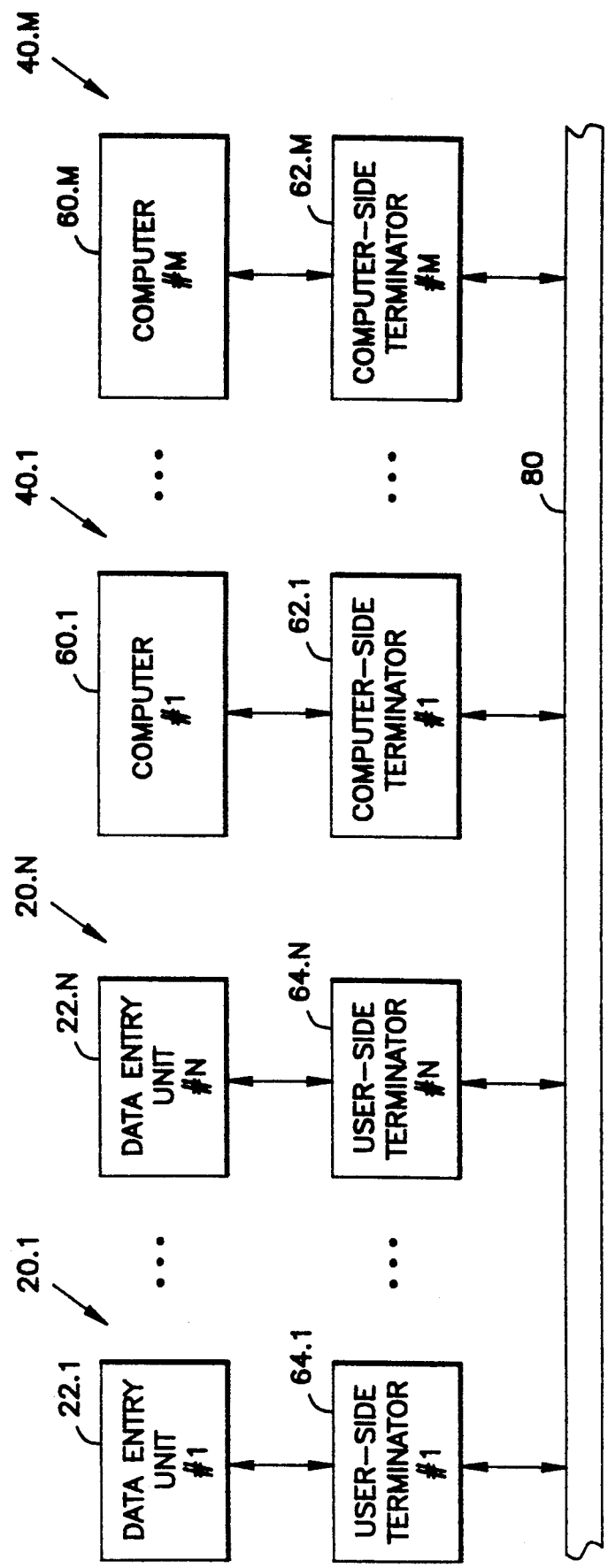
FIG. 3 is a block diagram representative of a network of user nodes and computer nodes according to the present invention.

FIG. 3 illustrates a network in which user nodes 20.1 through 20.N are connected over communications medium 80 to computer nodes 40.1 through 40.M. Each user node 20 includes a user side terminator 21 that serves as the interface between communications medium 80 and a data entry unit 22. Likewise, each computer node 40 contains a computer side terminator 41 which serves as the interface between communications medium 80 and a processor 42. Other data entry units 22 and processors 42 (not shown) could be attached to medium 80 without terminators 21 or 41. These nodes could only be used for unencrypted transfers.

Figure 4:
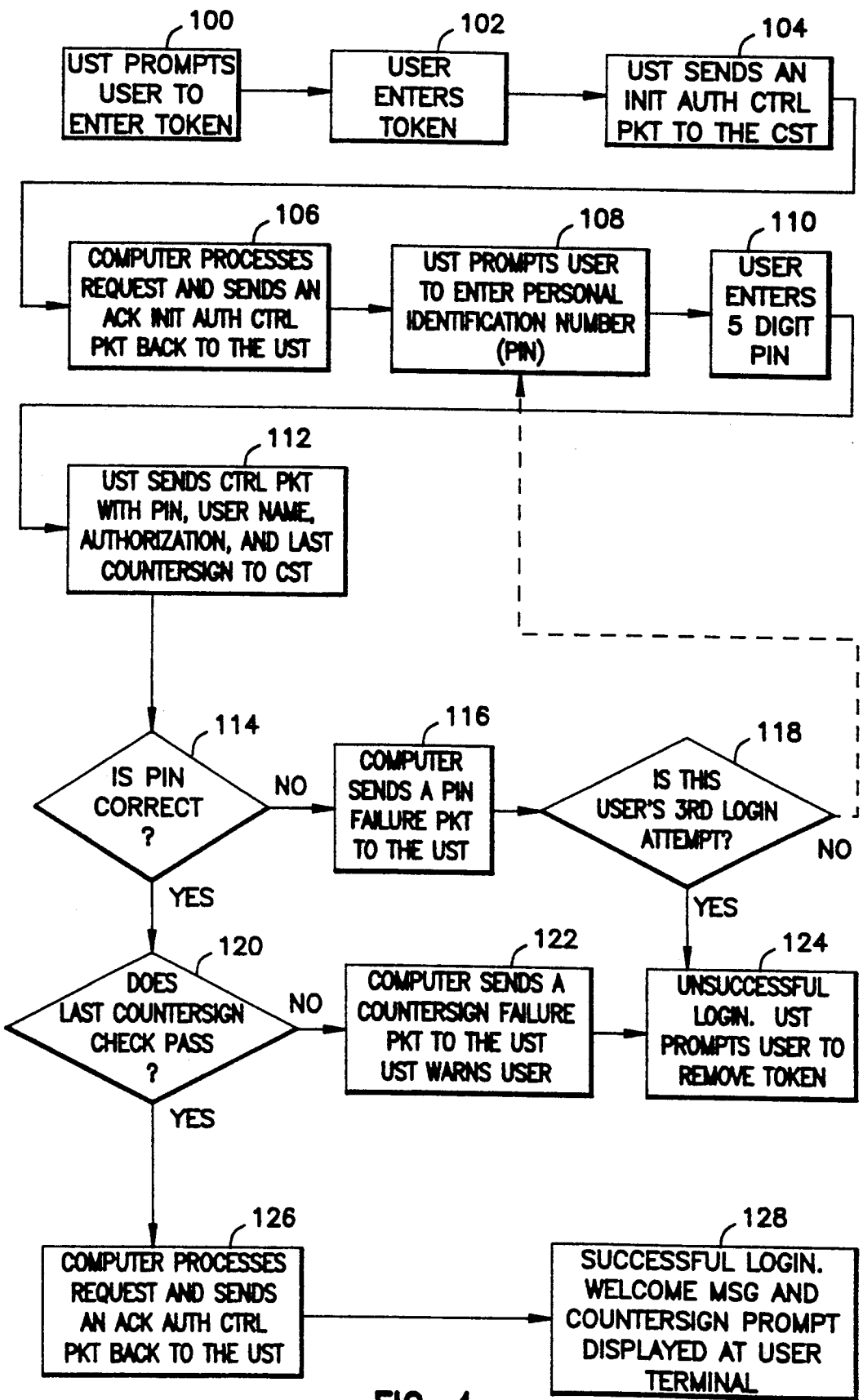
FIG. 4 is a flow chart representation of the steps taken in logging into a secure computer according to the present invention.

Operation of controller 66 and controller 76 in user-side terminator 64 and computer-side terminator 74, respectively, will be described next. A sequence of steps representative of logging in to a secure computing system according to the present invention is illustrated in FIG. 4. On receiving power, controller 76 and computer 60 execute diagnostic self-tests and perform initialization routines. Computer 60 then waits for users to log in.

On receiving power, controller 66 and data entry device 22 execute power-on self tests and initialization routines. In the preferred embodiment data entry unit 22 is held reset until controller 66 successfully completes its initialization routines. On successful completion of the routines, at 100 controller 66 displays an "Insert Token" prompt on display device 74 and waits for the insertion of a token 24. The identification and authentication sequence begins at 102 when a user entity 23 approaches an unoccupied data entry unit 22 and inserts token 24 into token reader 70. Token reader 70 reads the contents of token 24 and, at 104, controller 66 prepares a "Initialize Authorization" control message and sends it as a packet to computer-side terminator 62. Computer-side terminator 62 receives the packet and forwards it to computer 60.

At 106, computer 60 generates an "Acknowledge Initialize Authorization" control message and sends it as a packet to user-side terminator 64. At 108, controller 66 receives the "Acknowledge Initialize Authorization" control message and displays a password entry prompt. The user enters a five digit password into authentication device 72 at 110 and, at 112, controller 66 builds a message containing the password and the user name, access authorization and last countersign. This message is sent as a packet to computer-side terminator 62. Computer-side terminator 62 receives the packet and forwards it to computer 60 for verification.

At 114, computer 60 checks the password for correctness. If the password is not correct, at 116 computer 60 sends a "PIN Failure" control packet to user-side terminator 64. Controller 66 receives the "PIN Failure" control packet and, at 118, increments the error count. If the error count is less than three, control moves to 108 where controller 66 again displays the password entry prompt. If the error count equals three, control moves to 124 where an unsuccessful login error message is displayed. The user must then remove his token before he tries to gain access again.

If, at 114, the password is correct, at 120 computer 60 checks the last countersign read from token 24. If the countersign is not as expected, at 122 computer 60 sends a "Countersign Failure" control packet to user-side terminator 64. Controller 66 receives the "Countersign Failure" control packet and moves to 124 where an unsuccessful login error message is displayed. The user must then remove his token before he tries to gain access again.

If, at 120, the countersign is as expected, at 126 computer 60 sends an "Acknowledge Authorization" control packet to user-side terminator 64. Controller 66 receives the "Acknowledge Authorization" control packet and moves to 128 where a welcoming message is displayed to the user.

User authorization is performed in Trusted Path Mode to protect the integrity of the password and countersign. In Trusted Path Mode all messages between data entry unit 22 or controller 66 and computer 60 are encrypted. Once the user is authorized, user 23 can switch to Untrusted User mode by depressing mode select button 69. Untrusted User mode should be used for innocuous transfers such as electronic mail or public access data.

Figure 5:
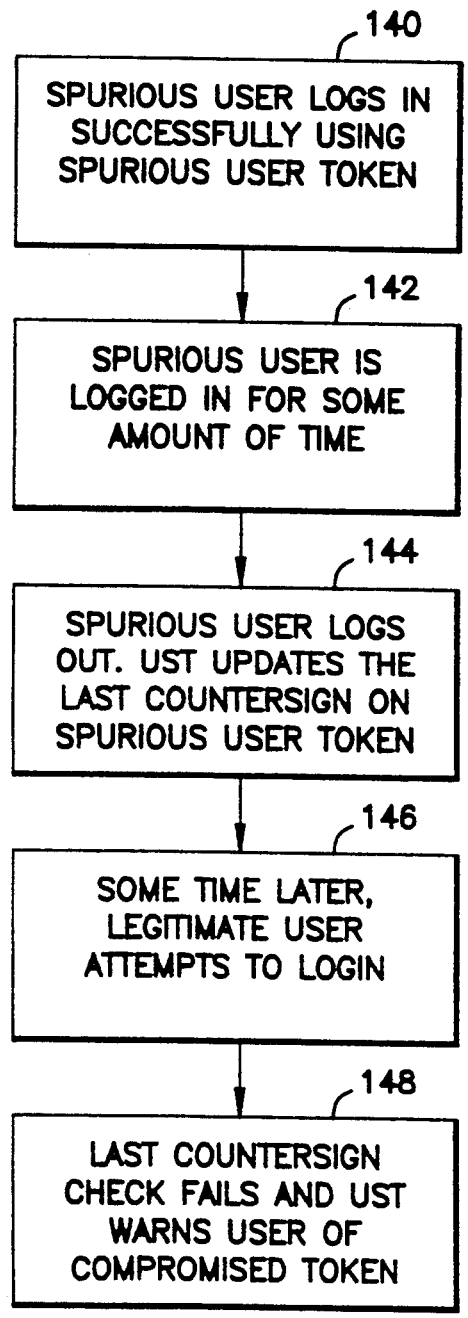
FIG. 5 is a flow chart representation of the steps taken in handling a compromised token according to the present invention.

The sequence of steps that would lead to a "Countersign Failure" control packet as in 122 above is illustrated in FIG. 5. An agent (spurious user) other than the legitimate user 23 gains access to token 24, makes a reproduction and returns the original token 24 undetected. Spurious user also gains knowledge of the password associated with token 24 by looking under the desk mat at the desk of user 23. At 140, spurious user uses the token reproduction and the discovered password to gain access to a user node 20, log into the system and, at 142, to access files. At 144, spurious user logs off the system, computer 60 updates the countersign associated with user 23 to a new countersign and that countersign is written by user-side terminator 64 to the reproduced token.

Some time later, at 146, legitimate user 146 attempts to login. Controller 66 and computer 60 go through the steps of FIG. 4 above and at 120 computer 60 determines that the countersign read from token 24 is not the last countersign issued to that user. A "Countersign Failed" is issued at 122 and at 148 controller 66 issues a compromised token warning.

The countersign method does not eliminate the threat of an illegitimate user gaining access to the system but it should severely cut down the time window during which that user can gain access to information.

Figure 6:
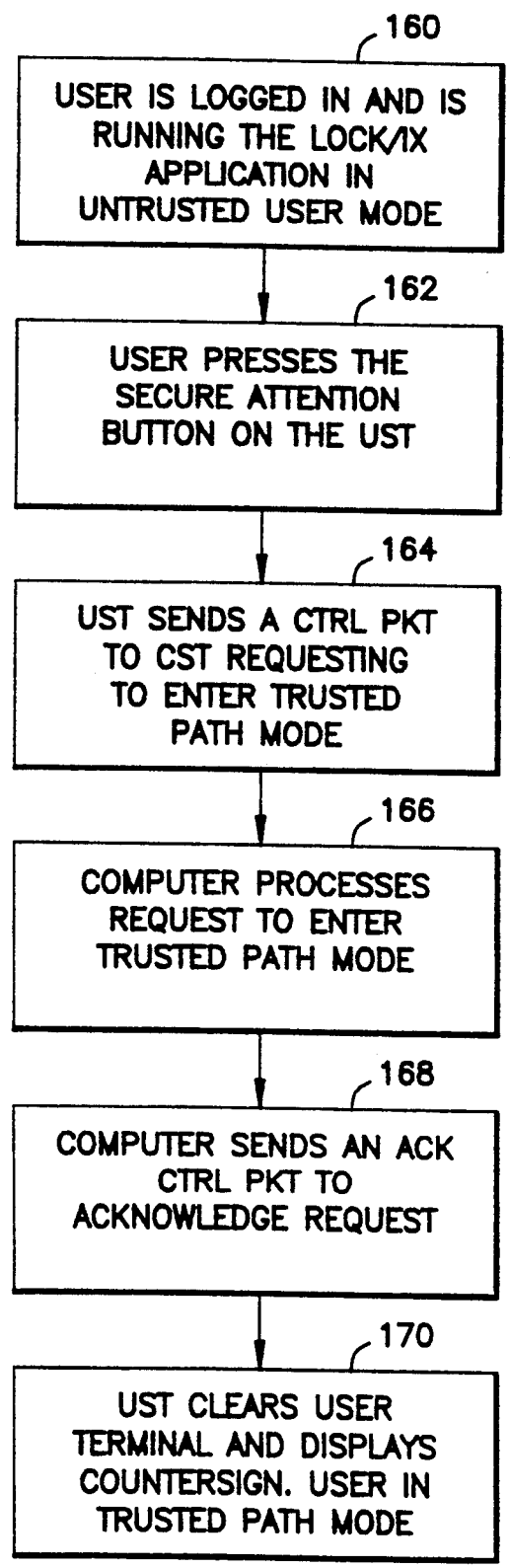
FIG. 6 is a flow chart representation of the steps taken in entering the Trusted Path mode according to the present invention.

The sequence of steps taken to enter Trusted Path mode is illustrated in FIG. 6. At 160 the communication link between a user node 20 and a computer node 40 is in the Untrusted User mode. At 162 user 23 depresses mode select button 69 of userside terminator 64. At 164, controller 66 of user-side terminator 64 generates a control message requesting a switch to Trusted Path mode. That message is sent as a packet to computerside terminator 62, processed and presented to computer 60.

At 166, computer 60 processes the request and at 168 returns a control packet acknowledge. Controller 66 receives the acknowledge and, at 170, clears the display of data entry unit 22, displays the countersign on the display of unit 22 and lights LED 71. All subsequent communication between node 20 and node 40 will be encrypted until mode select button 69 is again depressed (to switch to Untrusted User mode) or the keystream falls out of synchronization.

Figure 7:
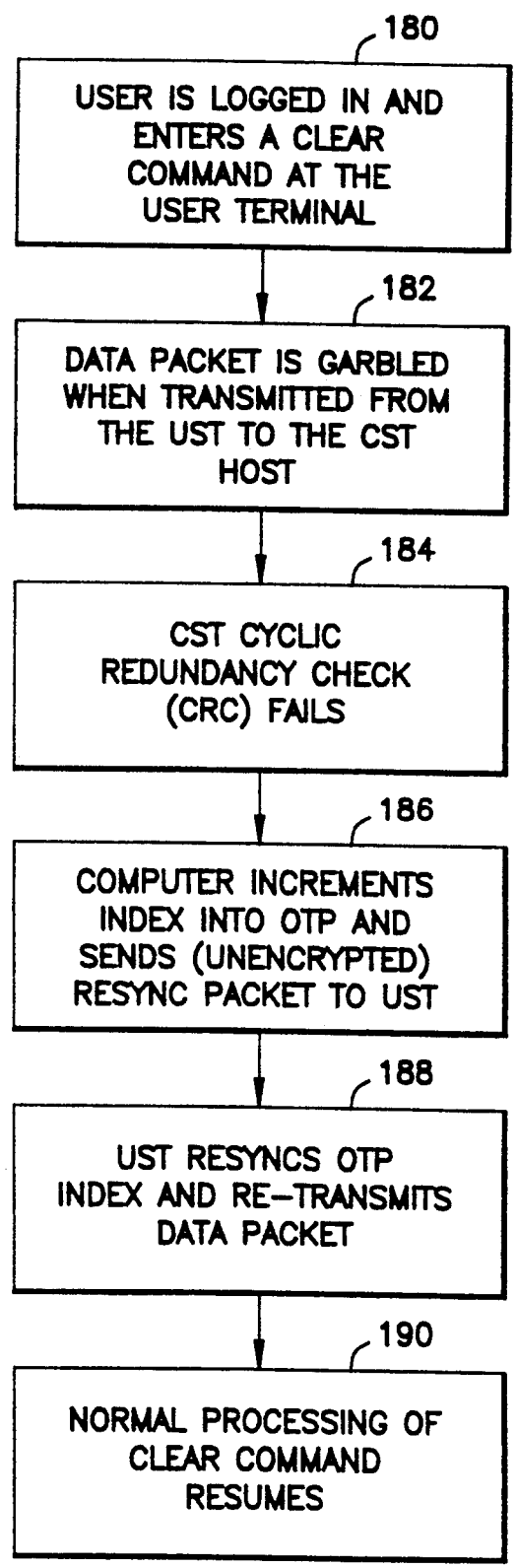
FIG. 7 is a flow chart representation of the steps taken in handling a garbled packet according to the present invention.

FIG. 7 is a representation of the steps taken in handling a packet garbled in the transmission between two remote nodes in Trusted Path mode according to the present invention. At 180, user 23 enters a command at data entry unit 22. At 182, the command is encrypted and transmitted to computer-side terminator 62. During transmission a portion of the packet is changed. This change is detected by computer-side terminator 62 at 184 through a cyclic redundancy check and the error is flagged to computer 60. At 186 computer 60 increments the keystream pointer and send the new pointer value in an unencrypted message to user-side terminator 64. Controller 66 receives the new keystream pointer value at 188, sets its keystream pointer to that value, encrypts the message again and sends it as a packet to computer-side terminator 62 so that at 190 normal processing resumes.

The present invention applies end-to-end encryption with the one-time pad to ensure secure communication. The onetime pad offers simplicity and, with adherence to simple administrative procedures, unbreakable encryption of communications. The end-to-end characteristic of the encryption permits secure communication without the need to perform costly analysis of complex elements of typical multilevel secure computers such as network controllers.

In addition, the present invention allows user entities to be identified and authenticated through a process which is simpler and more acceptable than present techniques such as passwords. It provides a more secure identification and authentication process that can then be used with a variety of data entry and display devices, either as a separate unit or integrated inside them. And it provides the confidentiality of a true trusted path mode, immune to observation or forgery by outside parties, with true authentication to either end of the communications path.

Although the present invention has been described with reference to the preferred embodiments, those skilled in the art will recognize that changes may be made in form and detail without departing from the spirit and scope of the invention.

What is claimed is:

1. A method of continual mutual authentication in communication over an unsecured communications medium between a data entry node, including a token reader, and a multi-level secure computer having a Secure Kernel, the method comprising the steps of:
   providing a user token which can be used to gain access to the multi-level secure computer, wherein the user token comprises data including identifier data characteristic of an individual and a countersign stored from a previous access by the individual;
   inserting the user token into the token reader;
   transferring, form the data entry node to the multi-level secure computer, a user authorization request including the stored countersign and the identifier data read from the inserted user token;
   verifying that the individual associated with the inserted user token has permission to access the multi-level secure computer;
   calculating, in the Secure Kernel of the multi-level secure computer, a new countersign;
   if the individual has permission to access the multi-level secure computer, transferring, from the multi-level secure computer to the data entry node, a user authorization acknowledgement including the new countersign;
   tagging each message from the multi-level secure computer to the data entry node with the new countersign; and
   storing the new countersign in the user token.

2. The method according to claim 1 wherein the step of verifying that the individual has permission to access the multilevel secure computer comprises:
   comparing, at the computer, the stored countersign to a countersign saved from the individual's previous access; and
   if the old countersign and the stored countersign are different, sending a countersign failure message to the data entry node and denying permission for the individual to access the computer.

3. The method according to claim 1 wherein the data entry node comprises:
   a data entry unit; and
   a user-side terminator connected between the data entry unit and the unsecured communications medium, the user-side terminator comprising:
      first communications interface means for controlling the transfer of data between the user-side terminator and the data entry unit;
      second communications interface means for controlling the transfer of data between the user-side terminator and the unsecured communications medium; and
      encryption/decryption means for selectively encrypting data to be transferred onto the unsecured communications medium and for decrypting data received from the unsecured medium; and
   wherein the step of transferring a user authorization request comprises the steps of:
   providing, between the multi-level secure computer and the unsecured communications medium, a computer-side terminator comprising:
      first communications interface means for controlling the transfer of data between the computer-side terminator and the multi-level secure computer;
      second communications interface means for controlling the transfer of data between the computerside terminator and the unsecured communications medium; and
      encryption/decryption means for selectively encrypting data to be transferred onto the unsecured communications medium and for decrypting data received from the unsecured medium;
   encrypting the user authorization request at the user-side terminator;
   transferring the encrypted user authorization request over the unsecured communications medium to the computer-side terminator;
   decrypting the encrypted user authorization request; and transferring the decrypted user authorization request to the multi-level secure computer.

4. A method of secure data transfers in communication between data entry units nd computers in a computing system having a plurality of nodes, wherein each node includes a data entry unit or a computer and wherein the nodes are connected via an unsecured communications medium, the method comprising the steps of:

providing a user token which can be used to gain access to a node of the computer system, wherein the user token comprises identifying characteristics of a particular user and a countersign stored from a previous access;

providing a plurality of communications elements which can be installed at a node to increase security in data transfers between nodes equipped with communications elements, wherein a communication element can be installed at a node by inserting the communications element between a data entry unit or computer and the unsecured communications medium and wherein each communications element comprises:

first communications interface means for controlling the transfer of data between the communications element and its associated data entry unit or computer;

second communications interface means for controlling the transfer of data between the communications element and the unsecured communications medium; and encryption/decryption means for selectively encrypting data to be transferred onto the unsecured communications medium and for decrypting data received from the unsecured medium;

installing a first and a second communications element at a first and a second node, respectively;

reading, at the first node, the user token;

transferring, form the first node to the second node, a user authorization request including the stored countersign and one or more of the identifying characteristics read from the user token;

verifying that the user at the first node has permission to access the data entry unit or computer at the second node;

if the user has permission to access the second node data entry unit or computer, transferring, from the second node to the first node, a user authorization acknowledgement including a new countersign; and storing the new countersign in the user token.

5. The method according to claim 4 wherein the step of verifying that the user has permission to access the second node data entry unit or computer comprises:

comparing, at the data entry unit or computer at the second node, the stored countersign to a countersign saved from the user's previous transaction; and if the stored countersign and the saved countersign are different, sending a countersign failure message to the first node and denying the user permission to access the second node data entry unit or computer.

* * * * *

UNITED STATES PATENT AND TRADEMARK OFFICE
CERTIFICATE OF CORRECTION

PATENT NO. : 5,272,754
DATED : December 21, 1993
INVENTOR(S) : William E. Boerbert It is certified that error appears in the above-indentified patent and that said Letters Patent is hereby corrected as shown below:

Title page, title line delete "Boerbert" and insert therefor --Boebert--.

section [75], delete "Boerbert" and insert therefor --Boebert--.

Column 11, line 67, delete "form" and insert therefor --from--.

Column 13, line 4, delete "nd" and insert therefor --and--.

Column 14, line 8, delete "form" and insert therefor --from--.

Signed and Sealed this

Twenty-fourth Day of December, 1996

Attest:

BRUCE LEHMAN

*Attesting Officer*    *Commissioner of Patents and Trademarks*